(12) United States Patent
Lee et al.

(10) Patent No.: US 11,548,260 B2
(45) Date of Patent: Jan. 10, 2023

(54) WINDOW AND DISPLAY DEVICE INCLUDING THE SAME

(71) Applicant: SAMSUNG DISPLAY CO., LTD., Yongin-si (KR)

(72) Inventors: Taeho Lee, Hwaseong-si (KR); Junwoo You, Seongnam-si (KR); Atsushi Nemoto, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 178 days.

(21) Appl. No.: 17/146,971

(22) Filed: Jan. 12, 2021

(65) Prior Publication Data

US 2021/0341970 A1 Nov. 4, 2021

(30) Foreign Application Priority Data

Apr. 29, 2020 (KR) .................. 10-2020-0052315

(51) Int. Cl.
*B32B 3/26* (2006.01)
*B32B 3/18* (2006.01)

(52) U.S. Cl.
CPC .............. *B32B 3/266* (2013.01); *B32B 3/18* (2013.01); *B32B 2307/418* (2013.01); *B32B 2457/20* (2013.01)

(58) Field of Classification Search
CPC ..... B32B 3/266; B32B 3/18; B32B 2307/418; B32B 2457/20
USPC ........................................................ 428/201
See application file for complete search history.

(56) References Cited

U.S. PATENT DOCUMENTS

| 10,462,273 | B2 | 10/2019 | Zhou et al. |
| 2015/0004334 | A1 | 1/2015 | Bae et al. |
| 2018/0181165 | A1* | 6/2018 | Park .................... H01L 27/3272 |
| 2019/0165311 | A1 | 5/2019 | Lee |
| 2021/0341970 | A1* | 11/2021 | Lee ....................... G06F 1/1652 |

FOREIGN PATENT DOCUMENTS

| KR | 1020180111901 A | 10/2018 |
| KR | 1020190064183 A | 6/2019 |

* cited by examiner

*Primary Examiner* — Betelhem Shewareged
(74) *Attorney, Agent, or Firm* — Cantor Colburn LLP

(57) ABSTRACT

A window includes a base layer including a folding region in which a groove is defined and a non-folding region, and a resin disposed on the groove and including a thiol group, wherein a difference between the refractive index of the base layer and the refractive index of the resin is less than about 0.1.

20 Claims, 13 Drawing Sheets

WINDOW AND DISPLAY DEVICE INCLUDING THE SAME

This application claims priority to Korean Patent Application No. 10-2020-0052315, filed on Apr. 29, 2020, and all the benefits accruing therefrom under 35 U.S.C. § 119, the content of which in its entirety is herein incorporated by reference.

BACKGROUND

1. Field

Embodiments of the invention herein relate to a window and a display device having improved product reliability.

2. Description of the Related Art

Display devices display various images on a display screen to provide information to users. In general, the display devices display information within an allotted screen. In recent years, flexible display devices including a foldable flexible display panel have been being developed. The flexible display devices, unlike rigid display devices, are deformable, e.g., foldable, rollable, or bendable. The flexible display devices that are deformable into various shapes are portable regardless of an existing screen size, thereby improving user convenience.

SUMMARY

Embodiments of the invention provide a display device having improved product reliability.

An embodiment of the invention provides a window including a base layer including a folding region in which a groove is defined and a non-folding region, and a resin disposed in the groove and including a thiol group, where a difference between a refractive index of the base layer and a refractive index of the resin is less than about 0.1.

In an embodiment, the refractive index of the resin may be about 1.5 to about 1.6.

In an embodiment, the groove may include a first portion having a circular shape, a second portion spaced apart from the first portion and having a circular shape, and a third portion connecting the first portion and the second portion.

In an embodiment, the third portion may have a curved shape.

In an embodiment, the resin may include polydimethyl siloxane thiol.

In an embodiment, the resin may include at least one among a thiol-based crosslinking agent, an acrylic-based crosslinking agent, and a vinyl-based crosslinking agent polymerized with the polydimethylsiloxane thiol.

In an embodiment, the groove may be defined in plural in the folding region.

In an embodiment, the resin may have translucency.

In an embodiment, the base layer may have a thickness of about 100 micrometers ($\mu$m) to about 500 $\mu$m.

In an embodiment of the invention, a display device includes a display module and a window disposed on the display module, the window including a base layer including a folding region in which a plurality of grooves is defined, and a non-folding region, and a resin disposed in each of the plurality of grooves and including a thiol group, and a difference between a refractive index of the base layer and a refractive index of the resin is less than about 0.1.

In an embodiment, each of the plurality of grooves may include a first portion having a circular shape, a second portion spaced apart from the first portion and having a circular shape, and a third portion connecting the first portion and the second portion.

In an embodiment, a width of the third portion may include at least one of a first width or a second width greater than the first width.

In an embodiment, the plurality of grooves may include a first groove defined in the central region of the folding region, a second groove defined in the peripheral region of the folding region, and a third groove defined in the peripheral region and closer to the non-folding region than the second groove is to the non-folding region, and a distance between the first groove and the second groove may be equal to a distance between the second groove and the third groove.

In an embodiment, the plurality of grooves may include a first groove defined in the central region of the folding region, a second groove defined in the peripheral region of the folding region, and a third groove defined in the peripheral region and closer to the non-folding region than the second groove is to the non-folding region, and a distance between the first groove and the second groove may be smaller than a distance between the second groove and the third groove.

In an embodiment, the resin may have translucency.

In an embodiment, the resin may have elasticity.

In an embodiment, the resin may have a refractive index of about 1.5 to about 1.6.

In an embodiment, the window may have a thickness of about 100 $\mu$m to about 500 $\mu$m.

In an embodiment, the resin may include polydimethylsiloxane thiol.

In an embodiment, the resin may include at least one among a thiol-based crosslinking agent, an acrylic-based crosslinking agent, and a vinyl-based crosslinking agent polymerized with the polydimethylsiloxane thiol.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
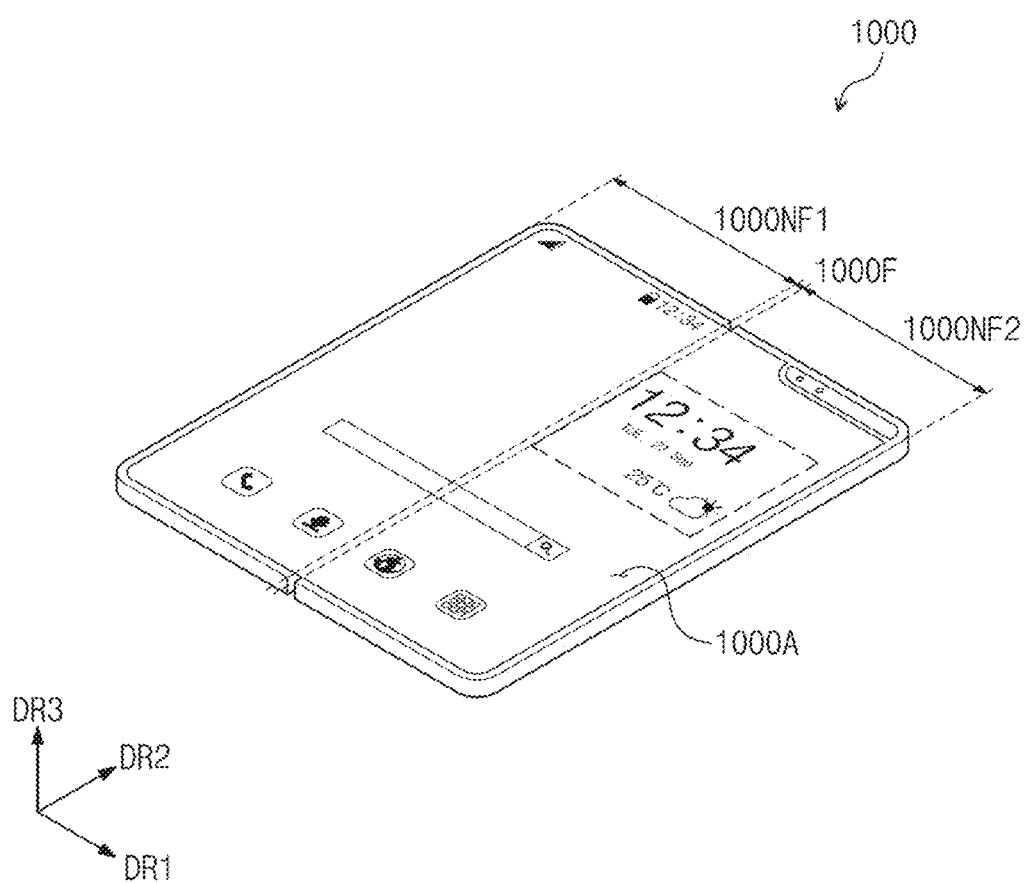
FIG. 1A is a perspective view of an embodiment of a display device according to the invention.

In the disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of embodiments of the inventive concept. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the inventive concept pertains. It is also to be understood that terms defined in commonly used dictionaries should be interpreted as having meanings consistent with the meanings in the context of the related art, and are expressly defined herein unless they are interpreted in an ideal or overly formal sense.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

It should be understood that the terms such as "substantially identical" are the same, including process errors that may generally occur with respect to numerical ranges stated in the description. It should be understood that in the description, that the refractive index of a base layer is substantially the same as the refractive index of a resin indicates that the refractive index of the base layer and the refractive index of the resin are identical, and a difference in the refractive index is so small that the path of light at an interface of the base layer and the resin stays the same, for example.

Hereinafter, embodiments of the invention will be described with reference to the accompanying drawings.

Figure 1B:
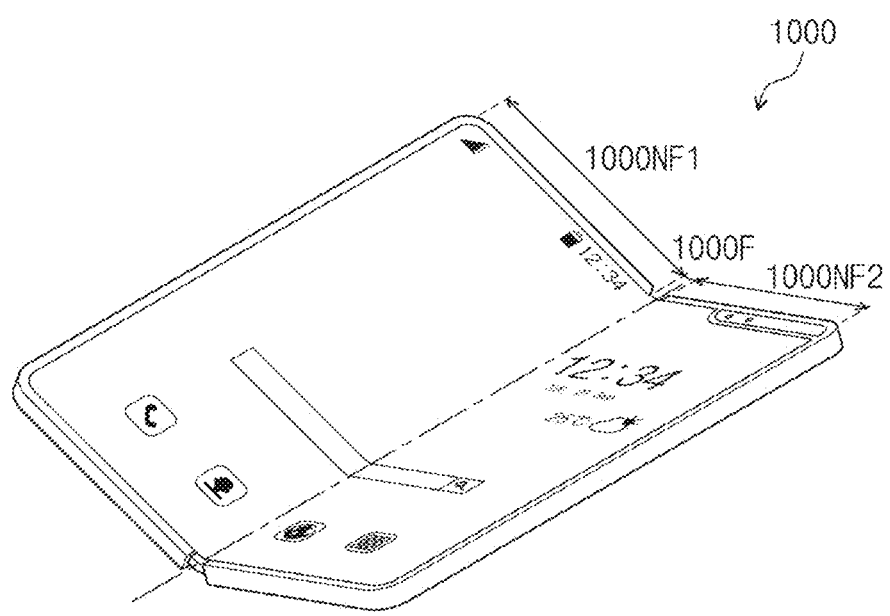
FIG. 1B is an operation state view of an embodiment of a display device according to the invention.
Figure 1B:
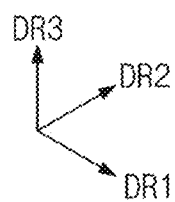

FIG. 1A is a perspective view of an embodiment of a display device according to the invention. FIG. 1B is an operation state view of an embodiment of a display device according to the invention.

Referring to FIGS. 1A and 1B, a display device 1000 may be activated according to electrical signals. In an embodiment, the display device 1000 may be a mobile phone, a tablet, a car navigation unit, a game console, or a wearable device, for example, but is not limited thereto. In FIG. 1A, an embodiment of a mobile phone is illustrated as the display device 1000.

The display device 1000 may be a foldable display device. The display device 1000 may sequentially define a first non-folding region 1000NF1, a folding region 1000F, and a second non-folding region 1000NF2 along a first direction DR1. That is, the folding region 1000F may be defined between the first non-folding region 1000NF1 and the second non-folding region 1000NF2.

In FIGS. 1A and 1B, one folding region 1000F and the first and second non-folding regions 1000NF1 and 1000NF2 are illustrated, but the number of the folding region 1000F and the first and second non-folding regions 1000NF1 and 1000NF2 is not limited thereto. In an embodiment, the display device 1000 may include more than two non-folding regions and folding regions disposed between the non-folding regions, for example.

The display device 1000 may display an image through an active region 1000A. In an unfolded state, the active region 1000A may include a plane parallel to a plane defined by the first direction DR1 and a second direction DR2. The thickness direction of the display device 1000 may be parallel to a third direction DR3 crossing the first direction DR1 and the second direction DR2. Therefore, a front surface (or an upper surface) and a rear surface (or a lower surface) of members constituting the display device 1000 may be defined with respect to the third direction DR3.

When the display device 1000 is folded, a display surface of the first non-folding region 1000NF1 and a display surface of the second non-folding region 1000NF2 may face each other. Therefore, when the display device 1000 is in a fully folded state, the active region 1000A may not be exposed to the outside. This state may be referred to as an in-folding state. However, this is merely an example and the invention is not limited thereto.

When the display device 1000 is folded, the display surface of the first non-folding region 1000NF1 and the display surface of the second non-folding region 1000NF2 may face the outside. Accordingly, in a folded state, the active region 1000A may be exposed to the outside. This state may be referred to as an out-folding state. In addition, the display device 1000 may be capable of both being in-folded and out-folded. In an embodiment, one folding region 1000F may be in-folded and out-folded, for example. In an alternative embodiment, the display device 1000 may include a plurality of folding regions, and some of them may be in-folded and others may be out-folded.

Figure 2:
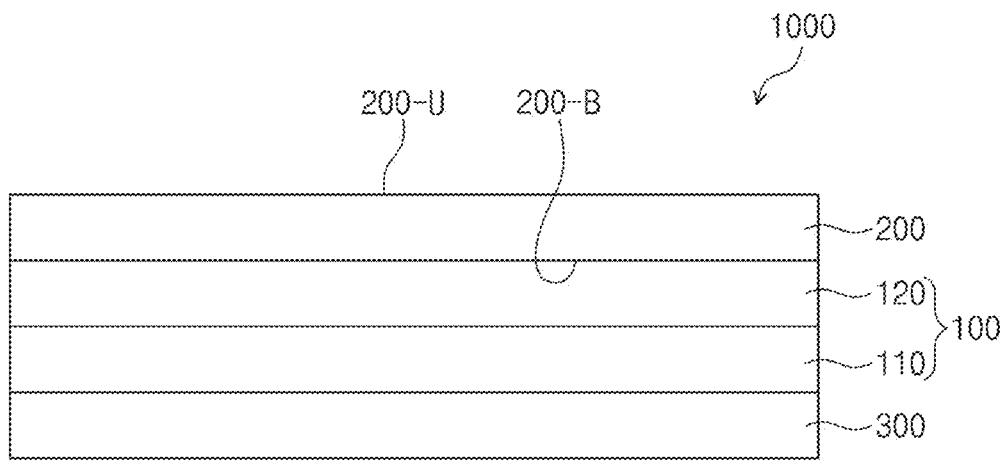
FIG. 2 is a cross-sectional view of an embodiment of a display device according to the invention.
Figure 2:
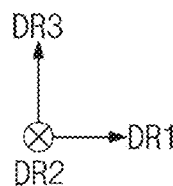

FIG. 2 is a cross-sectional view of an embodiment of a display device according to the invention.

Referring to FIG. 2, the display device 1000 may include a display module 100, an upper layer 200, and a lower layer 300.

The display module 100 may display an image and sense external inputs. The external inputs may be an input of a user. In an embodiment, the input of the user may include various forms of external inputs such as a part of a user's body, light, heat, pen, or pressure.

The display module 100 may include a display panel 110 generating an image and an input sensor 120 acquiring coordinate information of external inputs.

The display panel 110 may be a light emitting display panel, but is not particularly limited. In an embodiment, the display panel 110 may be an organic light emitting display panel or a quantum dot light emitting display panel, for example. An emission layer of the organic light emitting display panel may include an organic light emitting material. An emission layer of the quantum dot light emitting display panel may include a quantum dot, a quantum rod, etc.

The input sensor 120 may be disposed on the display panel 110. The input sensor 120 may sense an external input using a mutual cap method and/or a self-cap method. However, methods for sensing an external input are not limited to the examples above.

The upper layer 200 may be disposed on the display module 100. The display module 100 may display an image in a direction toward the upper layer 200. The upper layer 200 is disposed on the display module 100 to protect the display module 100. Detailed descriptions on the upper layer 200 will be described later.

The lower layer 300 may be disposed under the display module 100. The lower layer 300 may protect a rear surface of the display module 100. In an embodiment, the lower layer 300 may include a synthetic resin film such as a polyimide film or a polyethylene terephthalate film, and a cushion layer disposed under the synthetic resin film to include a sponge, foam, a urethane resin, etc., for example.

Figure 3:
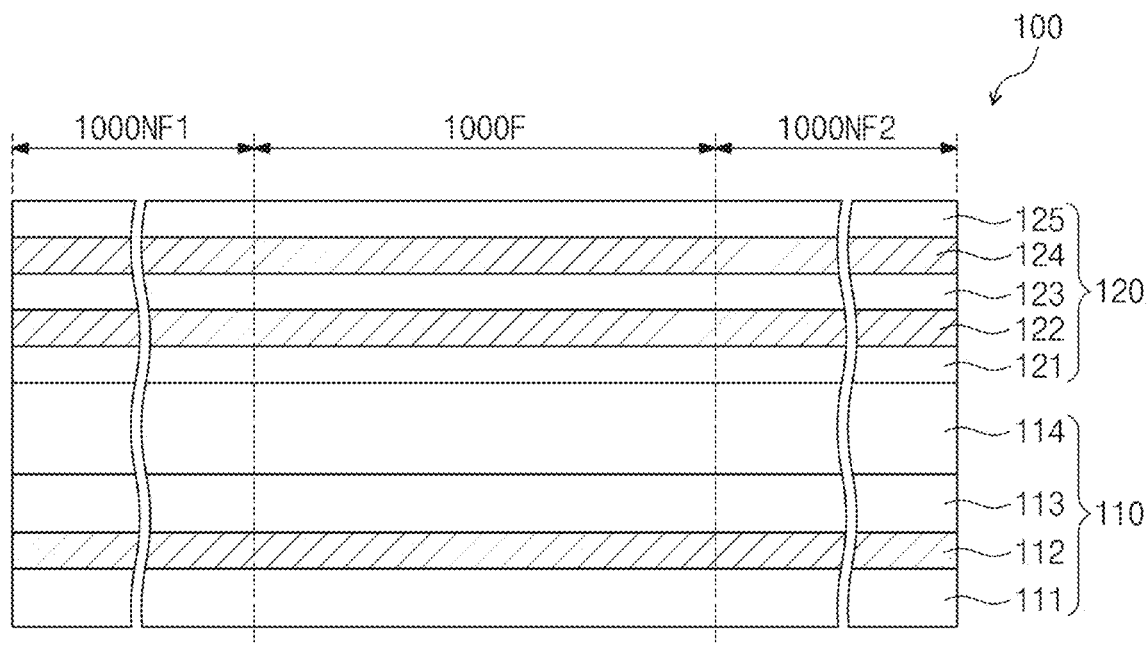
FIG. 3 is a cross-sectional view of an embodiment of a display module according to the invention.
Figure 3:
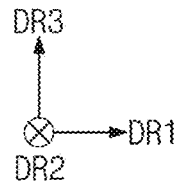

FIG. 3 is a cross-sectional view of an embodiment of a display module according to the invention.

Referring to FIG. 3, the case where the display panel 110 is an organic light emitting display panel will be described as an example.

The display panel 110 may include a base layer 111, a circuit element layer 112 disposed on the base layer 111, a display element layer 113, and a thin film encapsulation layer 114. Although not separately illustrated, the display panel 110 may further include functional layers such as a buffer layer and a refractive index control layer.

The base layer 111 may include a synthetic resin film. A synthetic resin layer is disposed on a work substrate used in the manufacture of the display panel 110. Thereafter, a conductive layer and an insulating layer are disposed on the synthetic resin layer. When the work substrate is removed, the synthetic resin layer may correspond to the base layer 111. The synthetic resin layer may include a thermosetting resin. In particular, the synthetic resin layer may be a polyimide-based resin layer, and the material is not particularly limited. In addition, the base layer 111 may include a glass substrate, a metal substrate, or an organic/inorganic composite material substrate.

The circuit element layer 112 includes at least one insulating layer and a circuit element. Hereinafter, the insulating layer included in the circuit element layer 112 is also referred to as an intermediate insulating layer. The intermediate insulating layer may include at least one intermediate inorganic film and/or at least one intermediate organic film. The circuit element includes signal lines, pixel driving circuits, etc. The circuit element layer 112 may be provided through a process of forming an insulating layer, a semiconductor layer, and a conductive layer by coating, deposition, etc., and a process of patterning the insulating layer, the semiconductor layer, and the conductive layer by a photolithography process.

The display element layer 113 includes a light emitting element. The display element layer 113 may include organic light emitting diodes. The display element layer 113 may further include an organic film such as a pixel defining film.

The thin film encapsulation layer 114 seals the display element layer 113. The thin film encapsulation layer 114 includes at least one insulating layer. The thin film encapsulation layer 114 in an embodiment of the invention may include at least one inorganic film (hereinafter, also referred to as an inorganic encapsulation film). The thin film encapsulation layer 114 in an embodiment of the invention may include at least one organic film (hereinafter, also referred to as an organic encapsulation film) and at least one inorganic encapsulation film.

The inorganic encapsulation film protects the display element layer 113 from moisture/oxygen, and the organic encapsulation film protects the display element layer 113 from foreign substances such as dust particles. In an embodiment, the inorganic encapsulation film may include a silicon nitride layer, a silicon oxynitride layer, a silicon oxide layer, a titanium oxide layer, an aluminum oxide layer, etc., for example, and is not particularly limited thereto. The organic encapsulation film may include an acryl-based organic film, and is not particularly limited.

The input sensor 120 may include a base insulating layer 121, a first conductive layer 122, a first insulating layer 123, a second conductive layer 124, and a second insulating layer 125.

The base insulating layer 121 may be an inorganic layer including any one among silicon nitride, silicon oxy nitride, and silicon oxide. In an alternative embodiment, the base insulating layer 121 may be an organic layer including an epoxy resin, an acrylic resin, or an imide-based resin. The base insulating layer 121 may be directly disposed on the display panel 110. In an alternative embodiment, the base insulating layer 121 may be disposed on a separate base layer, and the base layer may be bonded to each other through the display panel 110 and an adhesive member. In an alternative embodiment, the base insulating layer 121 may be omitted.

Each of the first conductive layer 122 and the second conductive layer 124 may include sensing electrodes or signal lines. Each of the first conductive layer 122 and the second conductive layer 124 may have a single layer structure or a multilayer structure stacked along a third direction DR3. The single-layered conductive layer may include a metal layer or a transparent conductive layer. In an embodiment, the metal layer may include at least any one among molybdenum, silver, titanium, copper, aluminum, or an alloy thereof, for example. In an embodiment, the transparent conductive layer may include a transparent conductive oxide such as indium tin oxide ("ITO"), indium zinc oxide ("IZO"), zinc oxide (ZnO), or indium tin zinc oxide ("ITZO"). In addition, the transparent conductive layer may include a conductive polymer such as poly(3,4-ethylenedioxythiophene) ("PEDOT"), a metal nanowire, graphene, etc.

The multi-layered conductive layer may include multi-layered metal layers. In an embodiment, the multi-layered metal layers may have a three-layer structure of, for example, titanium/aluminum/titanium. The multi-layered conductive layer may include at least one metal layer and at least one transparent conductive layer.

Each of the first insulating layer 123 and the second insulating layer 125 may have a single layer structure or a multilayer structure. Each of the first insulating layer 123 and the second insulating layer 125 may include inorganic or organic materials or composite materials.

At least any one of the first insulating layer 123 or the second insulating layer 125 may include an inorganic film. In an embodiment, the inorganic film may include at least one among aluminum oxide, titanium oxide, silicon oxide, silicon oxynitride, zirconium oxide, and hafnium oxide, for example.

At least any one of the first insulating layer 123 or the second insulating layer 125 may include an organic film. In an embodiment, the organic film may include at least any one among an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin, for example.

Figure 4:
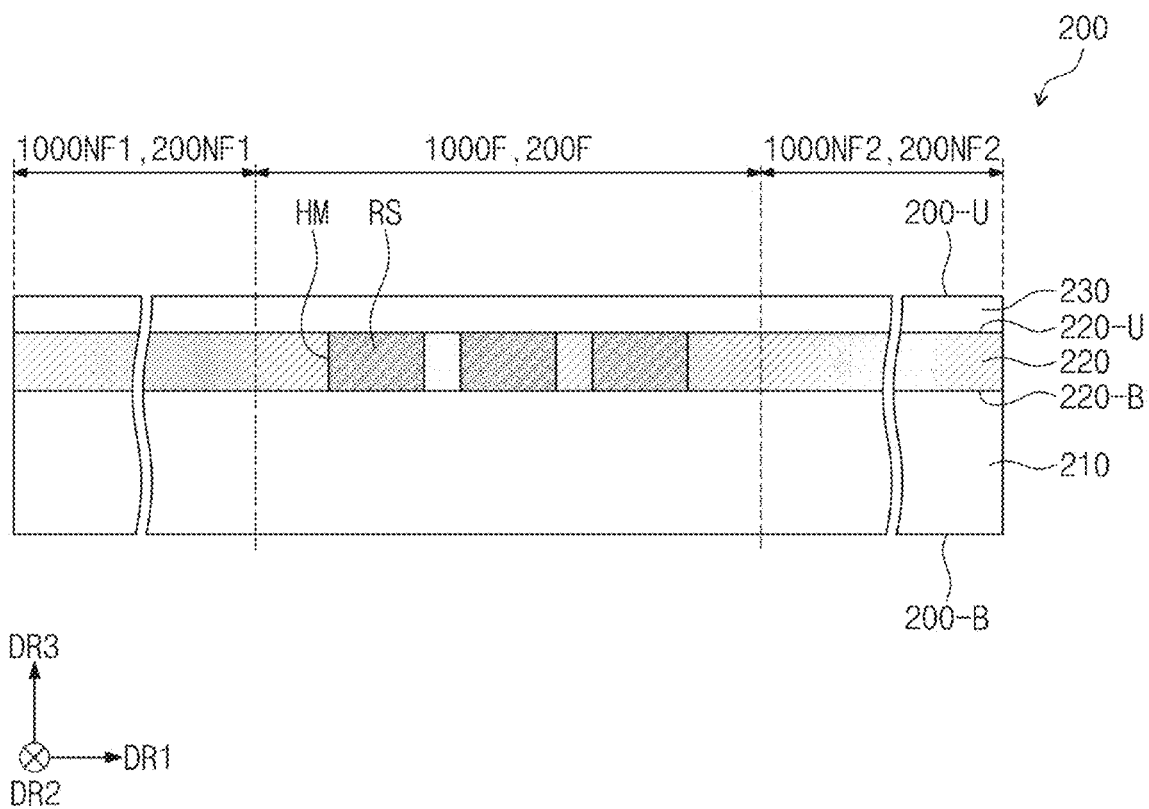
FIG. 4 is a cross-sectional view of an embodiment of an upper layer according to the invention.
Figure 5:
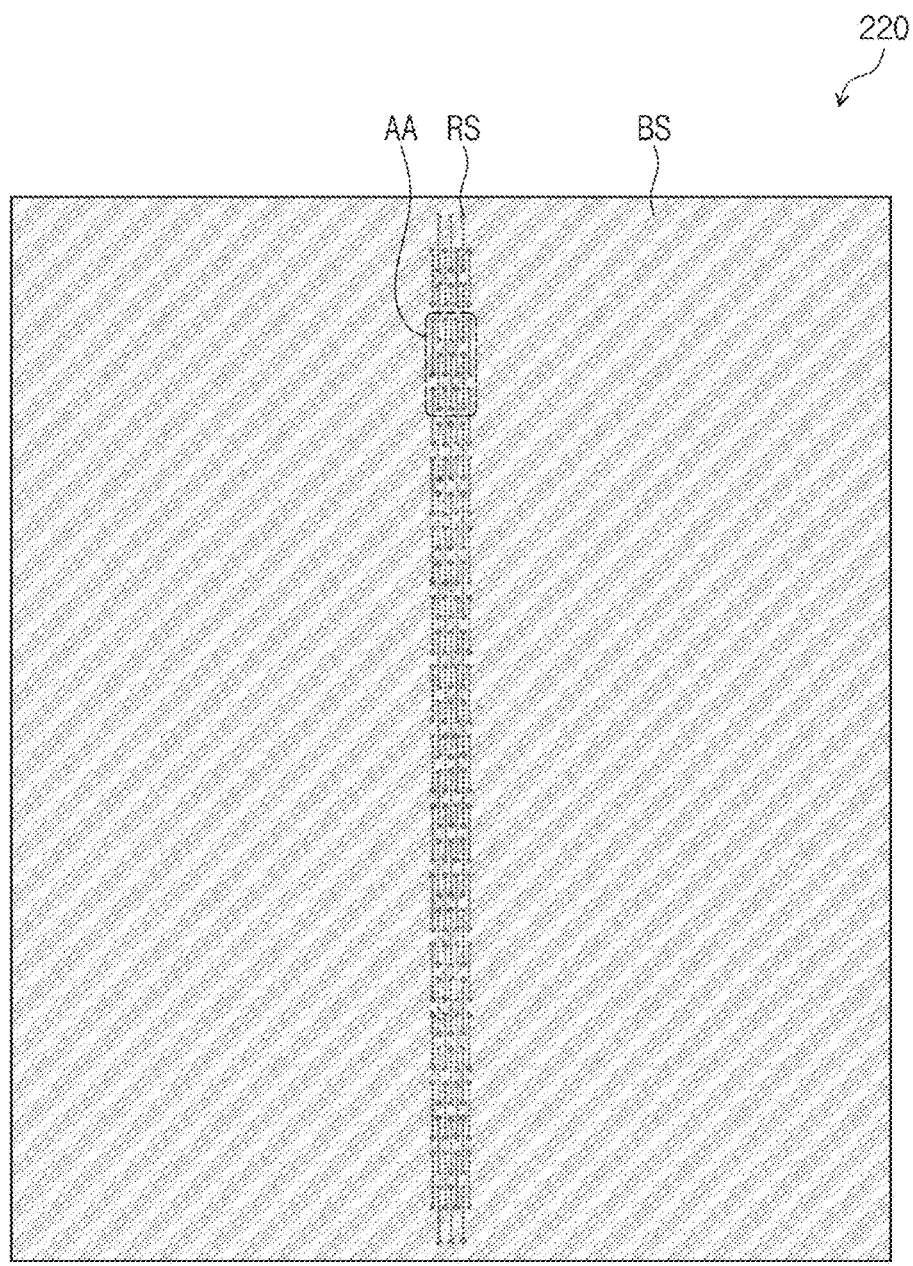
FIG. 5 is a plan view of an embodiment of a window according to the invention.
Figure 6:
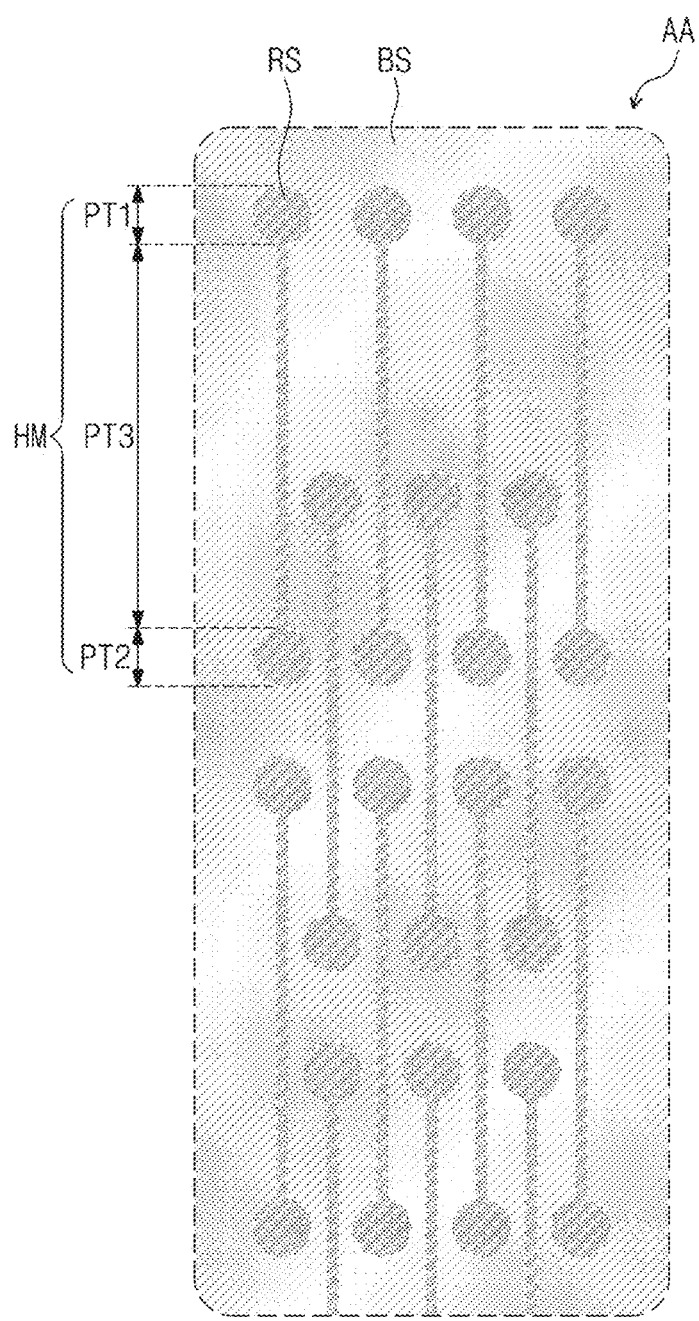
FIG. 6 is an enlarged view illustrating an embodiment of an area AA illustrated in FIG. 5.

FIG. 4 is a cross-sectional view of an embodiment of an upper layer 200 according to the invention. FIG. 5 is a plan view of an embodiment of a window 220 according to the invention. FIG. 6 is an enlarged view illustrating an embodiment of an area AA illustrated in FIG. 5.

Referring to FIG. 4, the upper layer 200 may include an adhesive layer 210, a window 220, and a functional coating layer 230, which are sequentially stacked along the third direction DR3. The adhesive layer 210 may constitute a lower surface 200-B of the upper layer 200, and the functional coating layer 230 may constitute an upper surface 200-U of the upper layer 200.

FIG. 4 illustrates merely an example of constituting the upper layer 200, and the components constituting the upper layer 200 are not limited to the example above. In an embodiment, the upper layer 200 may include only at least some of the components described above, for example. In an alternative embodiment, the upper layer 200 may further include other layers in addition to the components described above. In addition, the stacking order of the components constituting the upper layer 200 is not limited to the example illustrated in FIG. 4.

The adhesive layer 210 may include a conventional adhesive agent or a gluing agent. In an embodiment, the adhesive layer 210 may be a transparent adhesive member such as a pressure sensitive adhesive film ("PSA"), an optically transparent adhesive film ("OCA"), or an optically clear resin ("OCR"), for example.

The adhesive layer 210 may be disposed on the display module 100 (refer to FIG. 2). The upper layer 200 may be attached to the display module 100 (refer to FIG. 2) through the adhesive layer 210.

The window 220 may be disposed on the adhesive layer 210. In an embodiment, the window 220 may be in the form of a window layer. The window 220 may include the lower surface 220-B facing the adhesive layer 210 and the upper surface 220-U spaced apart from the adhesive layer 210 with the lower surface 220-B therebetween.

A first non-folding region 200NF1, a folding region 200F, and a second non-folding region 200NF2 may be defined along the first direction DR1 in the window 220. That is, the folding region 200F may be defined between the first non-folding region 200NF1 and the second non-folding region 200NF2. Each of the first non-folding region 200NF1, the folding region 200F, and the second non-folding region 200NF2 of the window 220 may correspond to each of the first non-folding region 1000NF1, the folding region 1000F, and the second non-folding region 1000NF2 of the display device 1000.

Referring to FIG. 5, the window 220 may include a base layer BS and a resin RS. Although not separately illustrated, the window 220 may further include a light blocking pattern (not shown). Referring to FIG. 6, the window 220 may include a base layer BS and a resin RS disposed in a plurality of grooves HM defined in the base layer BS.

The base layer BS may be tempered glass. Compared to a polyimide film, the tempered glass has strong scratch resistance to improve the shock resistance property of the display device 1000 (refer to FIG. 1A) when the tempered glass is applied to the window 220.

The thickness of the window 220 is the same as the thickness of the base layer BS. In an embodiment, the thickness of the base layer BS may be about 100 µm to about 500 µm, and preferably about 100 µm to about 400 µm, for example.

The resin RS may be disposed in each of the grooves HM. In an embodiment, each of the grooves HM may include a first portion PT1 having a circular shape, a second portion PT2 having a circular shape and spaced apart from the first portion PT1, and a third portion PT3 connecting the first portion PT1 and the second portion PT2. The shape of the third portion PT3 is not limited. Detailed descriptions on the resin RS and the grooves HM will be described later.

Figure 7:
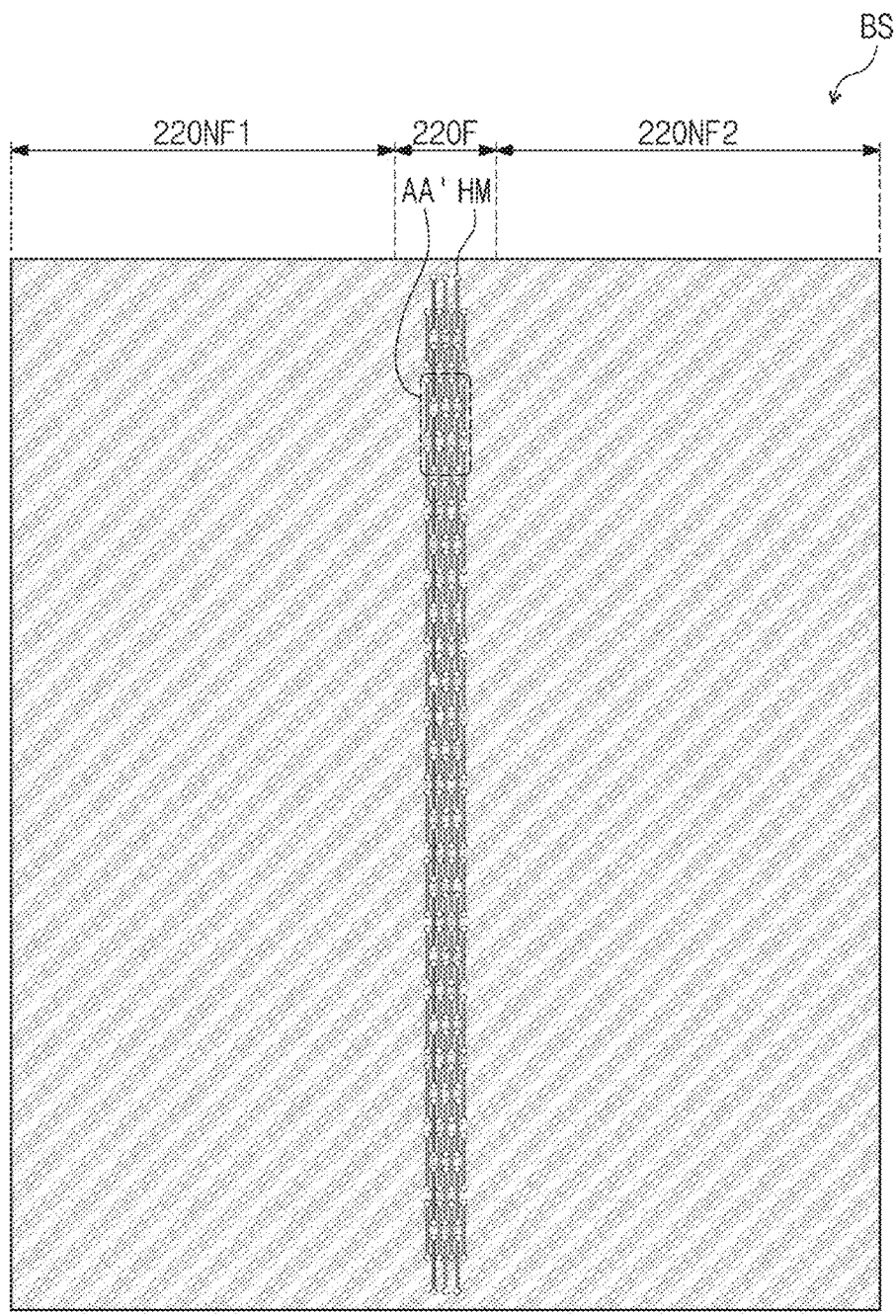
FIG. 7 is a plan view of an embodiment of a base layer according to the invention.
Figure 8A:
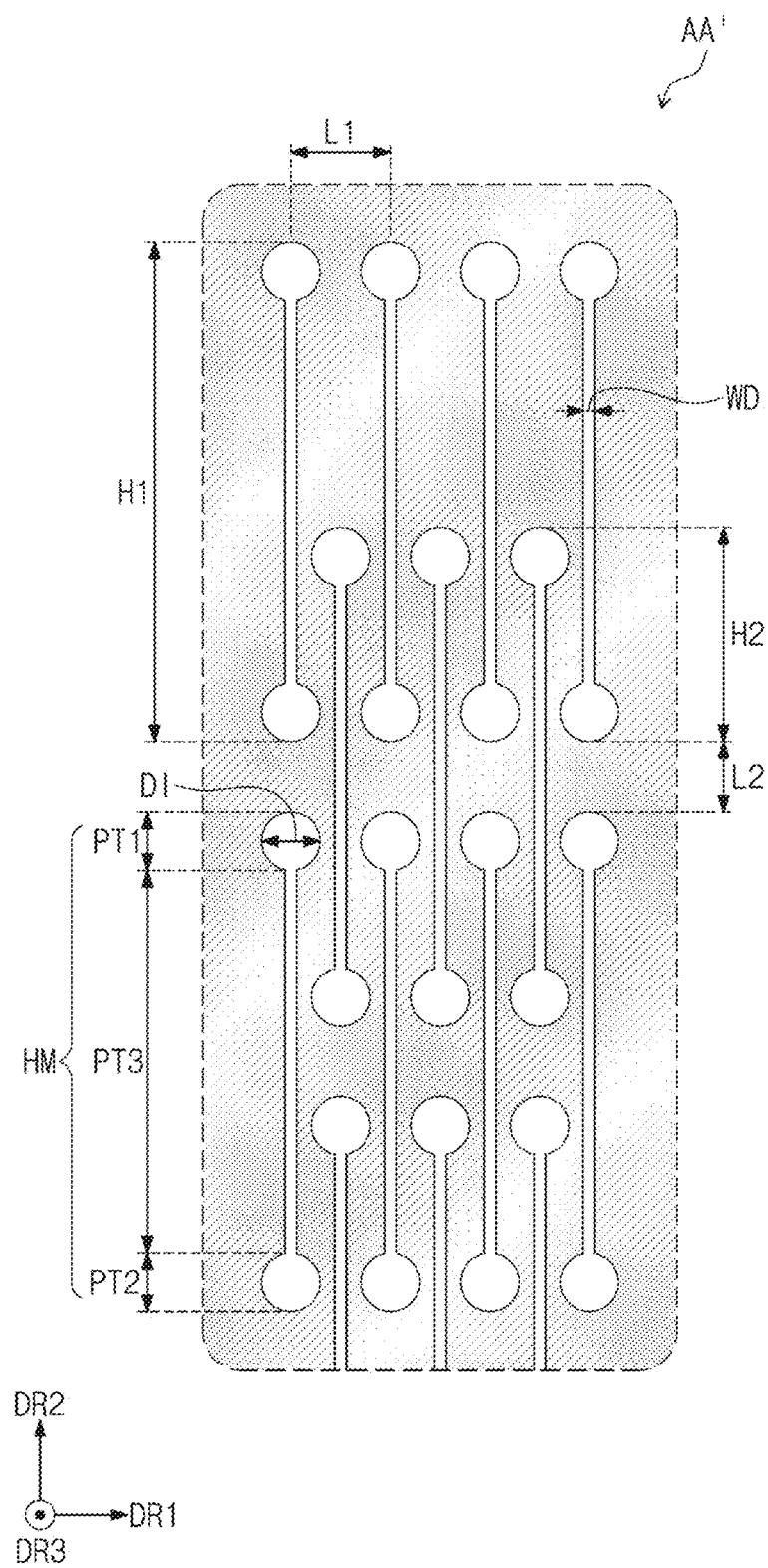
FIG. 8A is an enlarged view illustrating an embodiment of an area AA' illustrated in FIG. 7.
Figure 8B:
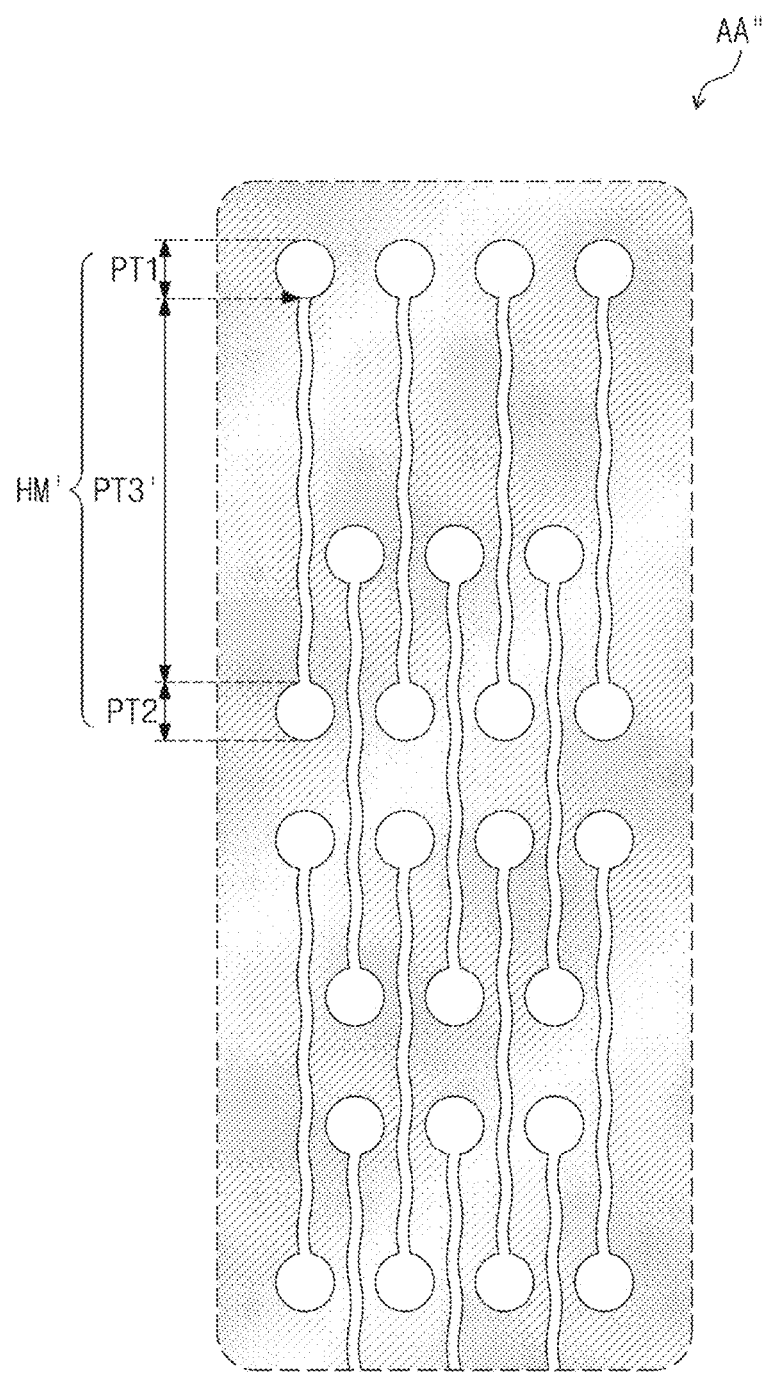
FIG. 8B is an enlarged view illustrating an embodiment of an area AA' illustrated in FIG. 7.

FIG. 7 is a plan view of a base layer BS according to the invention. FIG. 8A is an enlarged view illustrating an embodiment of an area AA' illustrated in FIG. 7. FIG. 8B is an enlarged view illustrating an embodiment of an area AA' illustrated in FIG. 7.

Referring to FIG. 7, a first non-folding region 220NF1, a folding region 220F, and a second non-folding region 220NF2 may be sequentially defined in the base layer BS along the first direction DR1. That is, the folding region 220F may be defined between the first non-folding region 220NF1 and the second non-folding region 220NF2. The folding region 200F and the non-folding regions 200NF1 and 200NF2 (refer to FIG. 4) of the window 220 may correspond to the folding region 220F and the non-folding region 220NF1 and 220FN2 of the base layer BS.

The base layer BS may overlap the folding region 220F, and be folded along a folding axis defined in the upper surface 220-U or the lower surface 220-B of the base layer BS.

Referring to FIGS. 1A and 7 together, the base layer BS may be folded as the display device 1000. Each of the first non-folding region 220NF1, the folding region 220F, and the second non-folding region 220NF2 of the base layer BS may correspond to each of the first non-folding region 1000NF1, the folding region 1000F, and the second non-folding region 1000NF2 of the display device 1000.

In order to improve the folding property of the window 220, a plurality of grooves HM may be defined in the folding region 220F of the base layer BS.

FIG. 8A illustrates numerical values of the grooves HM. A length H1 indicates a value obtained by measuring the length of each of the grooves HM in the second direction DR2. A length H2 indicates a value obtained by measuring the length in which the grooves HM overlap each other in the first direction DR1. A length L1 indicates the distance where the grooves HM are spaced apart in the first direction DR1. A length L2 indicates the distance where the grooves HM are spaced apart in the second direction DR2. A length DI indicates the diameter of the first portion PT1 of each of the grooves HM. A length WD indicates the width of the third portion PT3 of each of the grooves HM.

The numerical values of the grooves HM may be adjusted according to the thickness of the base layer BS. In an embodiment, when the thickness of the base layer BS is about 500 micrometers (μm), the length H1 may be 2500 μm or greater, for example. In an embodiment, the length H2 may be about 0.2 to about 0.6 times the length H1, for example. In an embodiment, the diameter DI may be about 150 μm to about 200 μm, for example. In an embodiment, the width WD may be about 25 μm to about 30 μm, for example. In an embodiment, a length L1 may be about 250 μm to about 300 μm, for example. In an embodiment, the length L2 may be about 500 μm to about 550 μm, for example. However, the invention is not limited thereto. When the thickness of the base layer BS changes, the values of the lengths H1, H2, DI, and WD may change at the same rate as the thickness change rate of the base layer BS.

In an embodiment, when the thickness of the base layer BS is about 250 μm, the length H1 may be about 1250 μm or greater, for example. In an embodiment, the length H2 may be about 0.2 to about 0.6 times the length H1, for example. In an embodiment, the diameter DI may be about 75 μm to about 100 μm, for example. In an embodiment, the width WD may be about 12.5 μm to about 15 μm, for example. In an embodiment, the length L1 may be about 125 μm to about 150 μm, for example. In an embodiment, the length L2 may be about 250 μm to about 275 μm, for example.

In an embodiment, when the thickness of the base layer BS is about 100 μm, the length H1 may be about 500 μm or greater, for example. In an embodiment, the length H2 may be about 0.2 to about 0.6 times the length H1, for example. In an embodiment, the diameter DI may be about 30 μm to about 40 μm, for example. In an embodiment, the width WD may be about 5 μm to about 6 μm, for example. In an embodiment, the length L1 may be about 50 μm to about 60 μm, for example. In an embodiment, the length L2 may be about 100 μm to about 110 μm, for example.

In an embodiment, even when the thickness of the base layer BS changes, the width of the folding region 220F may be maintained at 5 millimeter (mm), for example. The width of the folding region 220F indicates a length measured along the first direction DR1 illustrated in FIG. 8A.

Referring to FIG. 8B, in order to improve the visibility of a display device, a third portion PT3' may have a curved shape. In an embodiment, the third portion PT3' may have a wavy shape, for example. The optical interference phenomenon by grooves HM' is prevented by the third portion PT3' having a curved shape, thereby improving the visibility of the folding region 220F where the grooves HM' are defined. In addition, the same descriptions as described in FIGS. 5, 6, 7, and 8A may be applied to the grooves HM'.

Figure 9A:
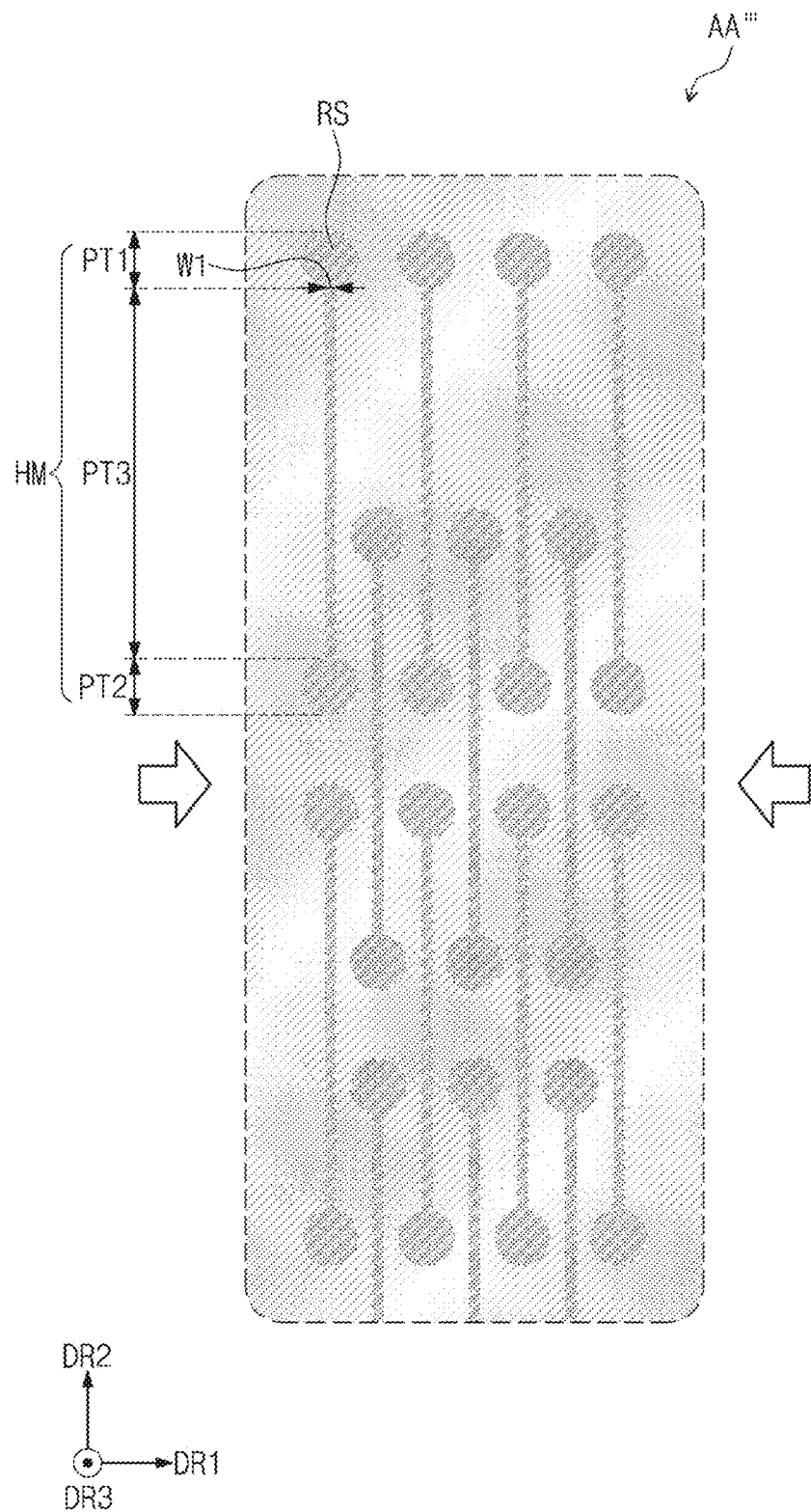
FIG. 9A is an enlarged view illustrating an embodiment of an area AA illustrated in FIG. 6.
Figure 9B:
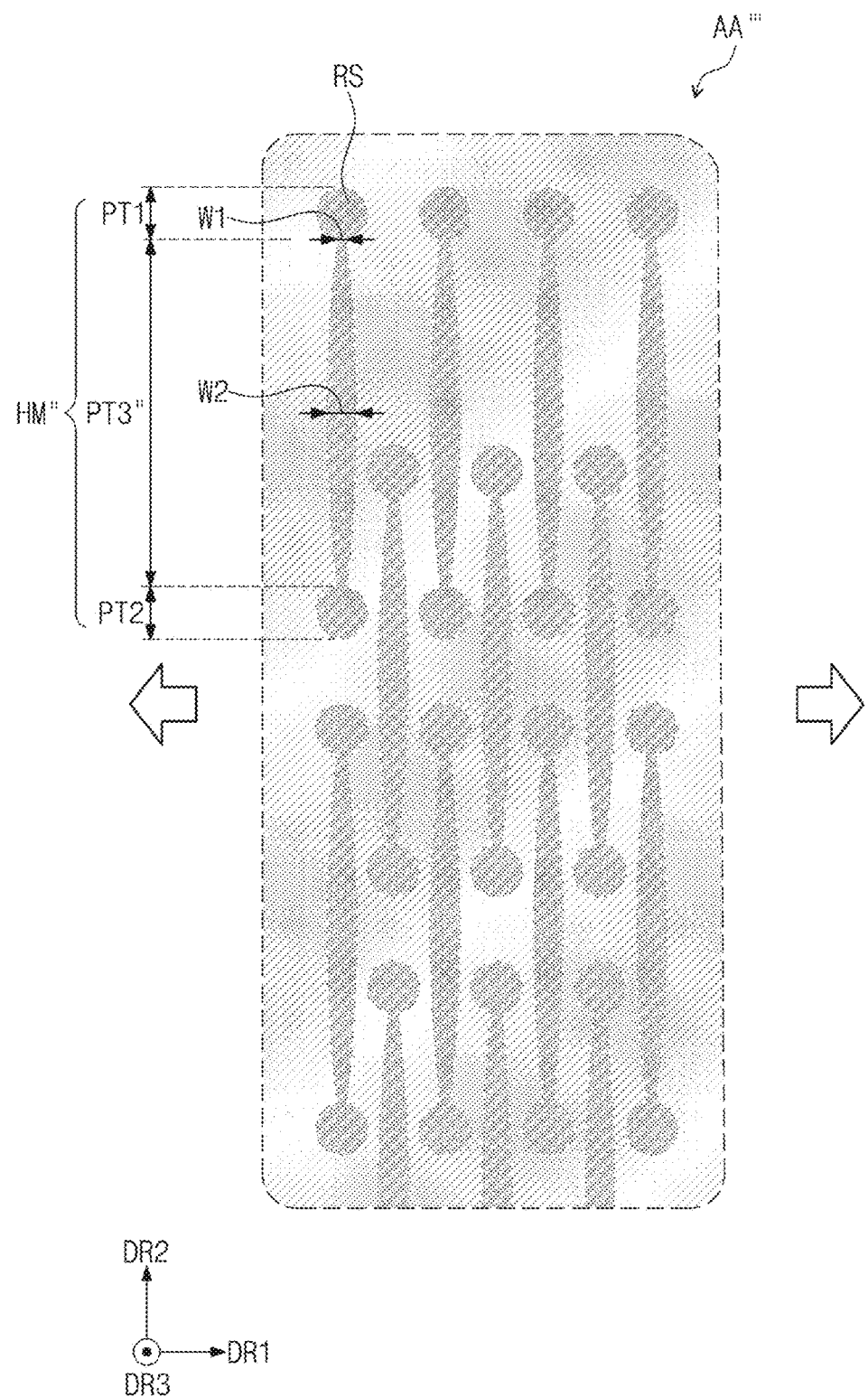
FIG. 9B is an enlarged view illustrating an embodiment of an area AA illustrated in FIG. 6.

FIGS. 9A and 9B are enlarged views illustrating an embodiment of an area AA illustrated in FIG. 6. FIGS. 9A and 9B illustrate an area AA''' as an embodiment of area AA illustrated in FIG. 6.

In an embodiment, when a compression force is applied to the window 220, as illustrated in FIG. 9A, the third portion PT3 of the groove HM may have a first width W1. The resin RS disposed in the groove HM may absorb the compression force applied to the window 220.

In an embodiment, when a tensile force is applied to the window 220, as illustrated in FIG. 9B, a third portion PT3" of a groove HM" has the first width W1 and a second width W2. The second width W2 may be a width measured at the center of the third portion PT3". The first width W1 may be the width of the third portion PT3" adjacent to the second portion PT2. The first width W1 is substantially the same as the first width W1 of the third portion PT3 illustrated in FIG. 9A. In an embodiment, the second width W2 is greater than the first width W1. That is, the width of the third portion PT3" may become smaller from the center of the third portion PT3" to the first portion PT1 and the second portion PT2. The resin RS disposed in the groove HM" may absorb the tensile force applied to the window 220.

Referring to FIGS. 9A and 9B, the window 220 may secure a flow space by a difference in value W2−W1 between the second width W2 and the first width W1 as a resin RS having an elastic force is disposed in the grooves HM. In addition, the flow space may be secured by adjusting the number of the grooves HM. In the display device 1000 in an embodiment, the flow space is secured in the window 220 through a plurality of grooves HM defined in the window 220 and the resin RS disposed thereon, thereby preventing the window 220 from being deformed by the compression force or the tensile force generated when the display device 1000 is folded.

Figure 10:
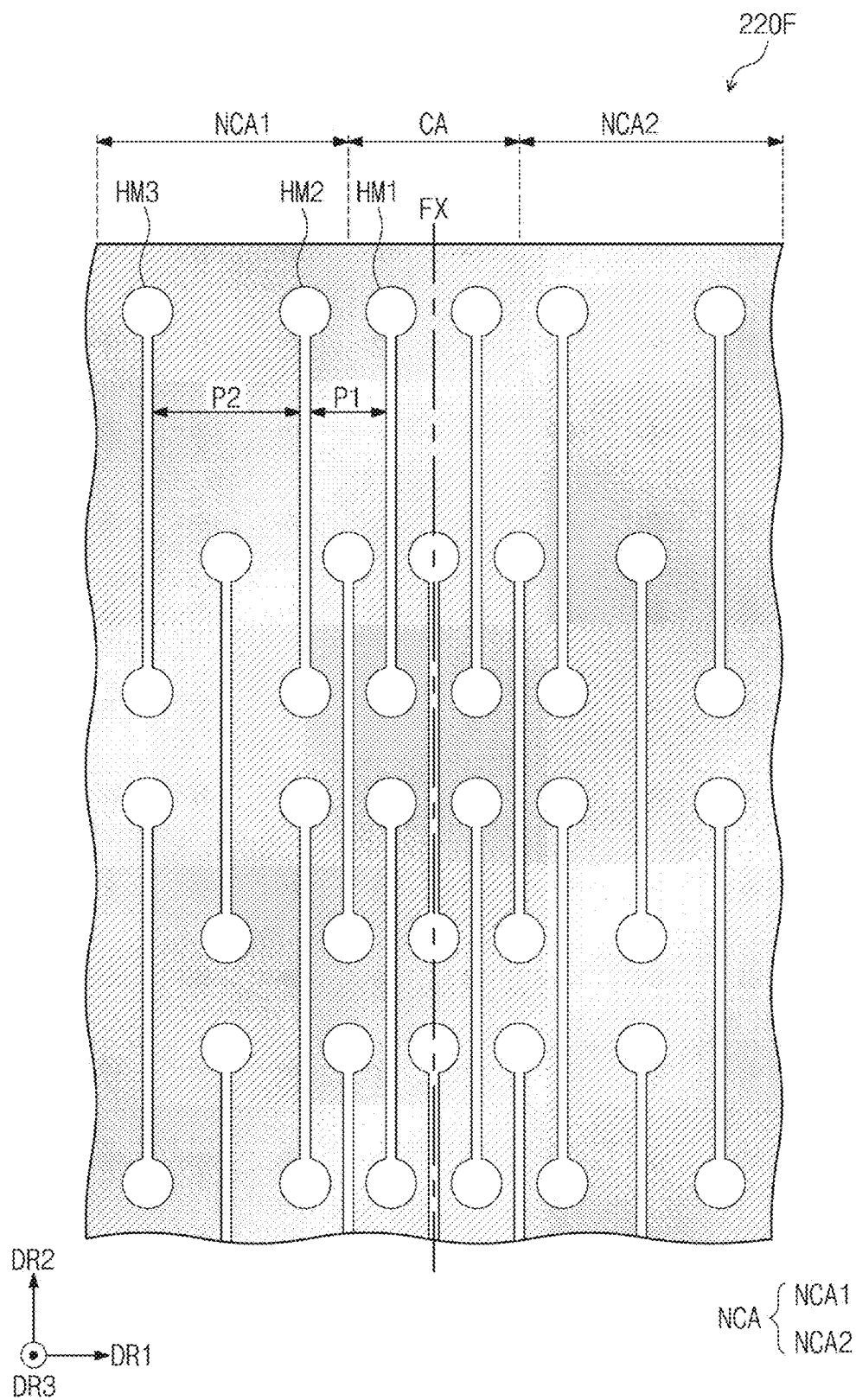
FIG. 10 is an enlarged plan view illustrating an embodiment of a portion of a base layer according to the invention.
Figure 11:
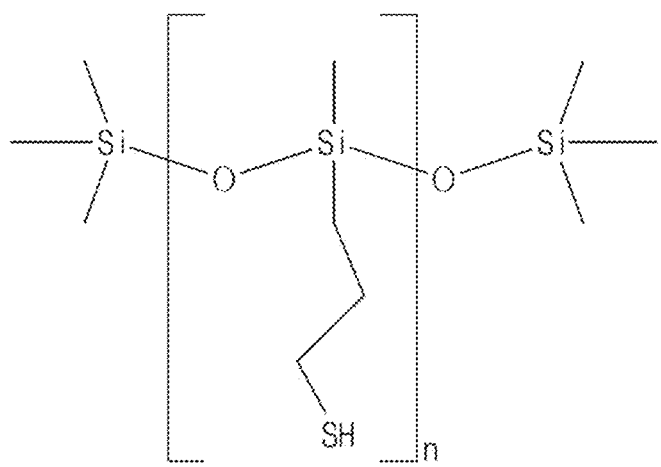
FIG. 11 schematically illustrates an embodiment of a resin according to the invention.

FIG. 10 is a plan view enlarging an embodiment of a portion of a base layer BS according to the invention. FIG. 11 schematically illustrates an embodiment of a resin RS according to the invention.

FIG. 10 illustrates an enlarged folding region 220F of a base layer BS. A first peripheral region NCA1, a central region CA, and a second peripheral region NCA2 may be sequentially defined in the folding region 220F along the first direction DR1. That is, the central region CA may be defined between the first peripheral region NCA1 and the second peripheral region NCA2.

The central region CA is a central portion of the folding region 220F, and may be a region where a folding axis FX of the base layer BS is defined in the central region CA. The base layer BS may be in-folded or out-folded along the folding axis FX.

The peripheral regions NCA1 and NCA2 may be regions between the central region CA and the non-folding regions 220NF1 and 220NF2 (refer to FIG. 7).

As illustrated in FIG. 10, in an embodiment, a first groove HM1 defined in the central region CA, and a second groove HM2 and a third groove HM3 defined in the first peripheral region NCA1 may be defined in the base layer BS. The second groove HM2 may be adjacent to the central region CA, and the third groove HM3 may be adjacent to the first non-folding region 220NF1 (refer to FIG. 7). That is, the second groove HM2 may be defined between the first groove HM1 and the third groove HM3.

Since the center region CA has a greater stress due to folding than the peripheral region NCA, a length of a first gap P1, which is a gap between the first groove HM1 and the second groove HM2, may be smaller than a length of a second gap P2, which is a gap between the second groove HM2 and the third groove HM3, along the first direction DR1. That is, the length of the gap between the grooves HM disposed in the central region CA may be smaller than the length of the gap between the grooves HM disposed in the peripheral region NCA. As the length of the gap between the grooves HM increases from the central region CA to the peripheral region NCA, the visibility of the display device 1000 may be improved.

FIG. 11 schematically illustrates an embodiment of a resin RS according to the invention. The resin RS includes or consists of a polymer including a thiol group (—SH) in the embodiment.

Referring to FIGS. 6, 7 and 11 together, the resin RS fills each of the grooves HM defined in the folding region 220F of the base layer BS.

As the resin RS is disposed in the folding region 220F (refer to FIG. 7), the resin RS of the invention may be selected within a range satisfying the folding and translucence properties of the window 220.

In order to satisfy the folding property of the window 220, the resin RS may have a predetermined elastic force. In an embodiment, the resin RS may be an elastomer. Specifically, the resin RS may be a polydimethyl siloxane ("PDMS")-based material, for example. The PDMS-based resin RS may absorb compressive stress or tensile stress applied when the window 220 is folded.

As the resin RS disposed in the folding region 220F has a predetermined elastic force, the resin RS may absorb stress caused by folding to prevent deformation of the window 220. Accordingly, the occurrence of crease caused when the window 220 is folded multiple times may be reduced.

The resin RS may be a translucent material. In order to improve the translucence property of the window 220 including two or more materials, a difference between the refractive index of the resin RS and the refractive index of the base layer BS may be less than 0.1, for example. Preferably, the refractive index of the resin RS and the refractive index of the base layer BS may be adjusted to be substantially the same.

In an embodiment, when the base layer BS is a glass substrate, the refractive index of the resin RS may be about 1.5 to about 1.6, for example.

Specifically, the refractive index of the resin RS may be about 1.5 to about 1.54, for example. To obtain a refractive index of 1.5 or greater, the resin RS may include or consist of a thiol group (—SH).

In an embodiment, the resin RS in an embodiment of the invention may include polydimethyl siloxane thiol to satisfy folding and translucence properties. In an embodiment, polydimethylsiloxane thiol is an elastomer and may have a refractive index of about 1.5 to about 1.54, for example.

In addition, the level of cross-linking may be controlled by polymerizing a crosslinking agent with the resin RS for fine adjustment of the refractive index and elastic modulus. In an embodiment, the resin RS including polydimethylsiloxane thiol and a crosslinking agent may be polymerized to increase thiolene cross-linking, for example. The crosslinking agent may include at least one among a thiol-based crosslinking agent, a vinyl-based crosslinking agent, and an acrylic-based crosslinking agent. In an embodiment, the thiol-based crosslinking agent may include pentaerythritol tetrakis(3-mercaptopropionate ("PETMP"), the vinyl-based crosslinking agent may include α, ω vinyl terminated PDMS, and the acrylic-based crosslinking agent may include pentaerythritol tetraacrylate, etc., for example.

In the window 220 in an embodiment of the invention, as the grooves HM are defined in the folding region 220F of the base layer BS, and the resin RS including a thiol group is disposed in each of the grooves HM, both folding and visibility properties may be improved. Accordingly, product reliability of the display device 1000 (refer to FIG. 1A) including the window 220 of an embodiment may be improved.

In an embodiment of the invention, folding properties of a display device may be improved by a plurality of grooves provided in a window and resins disposed in each of the plurality of grooves. In addition, a plurality of grooves may not be viewed from the outside by adjusting resin properties Although the invention has been described with reference to a preferred embodiment of the invention, it will be understood that the invention should not be limited to these preferred embodiments but various changes and modifications may be made by those skilled in the art without departing from the spirit and scope of the invention. Accordingly, the technical scope of the invention is not intended to be limited to the contents set forth in the detailed description of the specification.

What is claimed is:

1. A window comprising:
   a base layer including:
      a folding region in which a groove is defined; and
      a non-folding region; and
   a resin disposed in the groove and including a thiol group,
      wherein a difference between a refractive index of the base layer and a refractive index of the resin is less than about 0.1.

2. The window of claim 1, wherein the refractive index of the resin is about 1.5 to about 1.6.

3. The window of claim 1, wherein the groove comprises:
   a first portion having a circular shape;
   a second portion spaced apart from the first portion and having a circular shape; and
   a third portion connecting the first portion and the second portion.

4. The window of claim 3, wherein the third portion has a curved shape.

5. The window of claim 1, wherein the resin comprises polydimethyl siloxane thiol.

6. The window of claim 5, wherein the resin includes at least one among a thiol-based crosslinking agent, an acrylic-based crosslinking agent, and a vinyl-based crosslinking agent polymerized with the polydimethylsiloxane thiol.

7. The window of claim 1, wherein the groove is defined in plural in the folding region.

8. The window of claim 1, wherein the resin has translucency.

9. The window of claim 1, wherein the base layer has a thickness of about 100 micrometers to about 500 micrometers.

10. A display device comprising:
    a display module; and
    a window disposed on the display module, the window comprising:
    a base layer including:
       a folding region in which a plurality of grooves is defined; and
       a non-folding region; and
    a resin disposed in each of the plurality of grooves and including a thiol group,
       wherein a difference between a refractive index of the base layer and a refractive index of the resin is less than about 0.1.

11. The display device of claim 10, wherein each of the plurality of grooves comprises:
    a first portion having a circular shape;
    a second portion spaced apart from the first portion and having a circular shape; and
    a third portion connecting the first portion and the second portion.

12. The display device of claim 11, wherein a width of the third portion comprises at least one of a first width and a second width greater than the first width.

13. The display device of claim 10, wherein:
    the plurality of grooves comprises a first groove defined in the central region of the folding region, a second groove defined in the peripheral region of the folding region, and a third groove defined in the peripheral region and closer to the non-folding region than the second groove is to the non-folding region; and a length of a gap between the first groove and the second groove is equal to a length of a gap between the second groove and the third groove.

14. The display device of claim 10, wherein:

the plurality of grooves comprises a first groove defined in the central region of the folding region, a second groove defined in the peripheral region of the folding region, and a third groove defined in the peripheral region and closer to the non-folding region than the second groove is to the non-folding region; and a length of a gap between the first groove and the second groove is smaller than a length of a gap between the second groove and the third groove.

15. The display device of claim 10, wherein the resin has translucency.

16. The display device of claim 10, wherein the resin has elasticity.

17. The display device of claim 10, wherein the resin has a refractive index of about 1.5 to about 1.6.

18. The display device of claim 10, wherein the window has a thickness of about 100 micrometers to about 500 micrometers.

19. The display device of claim 10, wherein the resin includes polydimethylsiloxane thiol.

20. The display device of claim 19, wherein the resin includes at least one among a thiol-based crosslinking agent, an acrylic-based crosslinking agent, and a vinyl-based crosslinking agent polymerized with the polydimethylsiloxane thiol.

* * * * *